United States Patent
Johnson et al.

(10) Patent No.: US 9,848,148 B1
(45) Date of Patent: Dec. 19, 2017

(54) METHODS AND APPARATUS FOR A MULTIPLE STORAGE PIXEL IMAGING SYSTEM

(71) Applicant: SEMICONDUCTOR COMPONENTS INDUSTRIES, LLC, Phoenix, AZ (US)

(72) Inventors: Richard Scott Johnson, Boise, ID (US); Richard Mauritzson, Meridian, ID (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 13 days.

(21) Appl. No.: 15/185,829

(22) Filed: Jun. 17, 2016

(51) Int. Cl.
*H04N 5/372* (2011.01)
*H04N 5/335* (2011.01)

(52) U.S. Cl.
CPC ........... *H04N 5/372* (2013.01); *H04N 5/3355* (2013.01)

(58) Field of Classification Search
CPC .... H04N 5/2355; H04N 5/363; H04N 5/3559; H04N 5/35572; H04N 5/35581; H04N 5/374; H04N 5/378; H04N 5/3745; H04N 5/3765; H04N 5/37452; H04N 5/37457; H04N 5/372; H04N 5/355; H04N 5/35554; H04N 5/765; H04N 5/335; H04N 5/772; H01L 27/14641; H01L 27/14621; H01L 27/14625; H01L 27/14627; H01L 27/14643; H01L 27/14647; H01L 27/14609; H01L 27/14812; H01L 27/14887; H01L 27/1464; H01L 27/14679

USPC .......................................................... 348/308
See application file for complete search history.

(56) References Cited

U.S. PATENT DOCUMENTS

| | | | |
|---|---|---|---|
| 9,118,883 B2 | 8/2015 | Wan | |
| 9,332,200 B1* | 5/2016 | Hseih | H04N 5/363 |
| 9,456,159 B1* | 9/2016 | Hynecek | H04N 5/37457 |
| 9,692,997 B2* | 6/2017 | Hseih | H04N 5/363 |
| 2006/0181627 A1* | 8/2006 | Farrier | H01L 27/14603 348/308 |
| 2009/0141155 A1* | 6/2009 | Ellis-Monaghan | H04N 5/35527 348/308 |
| 2012/0241591 A1* | 9/2012 | Wan | H01L 27/1461 250/208.1 |
| 2012/0257093 A1* | 10/2012 | Sa | H01L 27/14609 348/302 |
| 2013/0027596 A1* | 1/2013 | Wan | H01L 27/14612 348/302 |
| 2013/0135486 A1* | 5/2013 | Wan | H04N 5/765 348/207.99 |
| 2014/0103411 A1* | 4/2014 | Dai | H01L 27/14609 257/292 |

(Continued)

*Primary Examiner* — Pritham Prabhakher
(74) *Attorney, Agent, or Firm* — The Noblitt Group, PLLC (57) ABSTRACT

Various embodiments of the present technology may comprise a method and apparatus for a pixel array. Each pixel may include multiple storage regions capable of storing pixel signals during integration. The method and apparatus may utilize the floating diffusion region as a storage region during both an integration period and readout period. The method and apparatus may store pixel signals corresponding to a first exposure periods in the floating diffusion region and pixel signals corresponding to a second exposure periods in a separate storage region.

20 Claims, 4 Drawing Sheets

(56) References Cited

U.S. PATENT DOCUMENTS

| | | | |
|---|---|---|---|
| 2015/0123172 A1* | 5/2015 | Chen | H01L 27/14614 257/230 |
| 2016/0037101 A1* | 2/2016 | Shim | H04N 5/374 348/241 |
| 2016/0225803 A1* | 8/2016 | Korobov | H01L 27/1464 |
| 2017/0099422 A1* | 4/2017 | Goma | H04N 5/2355 |
| 2017/0126993 A1* | 5/2017 | Madurawe | H04N 5/355 |

* cited by examiner

METHODS AND APPARATUS FOR A MULTIPLE STORAGE PIXEL IMAGING SYSTEM

BACKGROUND OF THE TECHNOLOGY

Multi-storage node pixels may be beneficial in high dynamic range (HDR) imaging, which may include overlapped-exposure imaging techniques. In overlapped-exposure HDR imaging, multiple images are captured with an image sensor over the same time period but with different exposure periods, and the images are later combined into a high dynamic range image.

Images captured at different times for the purpose of HDR imaging may result in distorted images for moving objects. Capturing images in an overlapped manner reduces the distortion as multiple image captures receive the same motion at the same time.

Rolling shutter architectures also result in image distortion for moving objects since images are captured in a sequential row-by-row fashion. As such, a global shutter design may be preferred to minimize the motion distortion associated with rolling shutter circuits, since all pixels in a global shutter imager integrate light simultaneously.

Conventional global shutter pixels capable of correlated doubled sampling have at least one photo sensitive element, a dedicated in-pixel storage region, and a floating diffusion region. The pixels operate by transferring charge to the storage region after integration, resetting the floating diffusion region prior to readout, and then reading out the charge from the storage region to the floating diffusion region for sampling. As such, the floating diffusion region is utilized only during the readout period.

Creating a HDR image utilizing a global shutter design with pixels formed with multiple storage regions results in larger pixels, or for a given pixel size, reduces the area for the photodiode, thus decreasing sensitivity.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various semiconductor devices, such as switches, capacitors, photosensors, and the like, which may carry out a variety of functions. In addition, the present technology may be practiced in conjunction with any number of imaging systems and the apparatus and method embodiments described are merely exemplary applications for the technology. Further, the present technology may employ any number of conventional techniques for capturing image data, sampling image data, readout of image data, and the like.

Methods and apparatus for a multi-storage node pixel 100 (FIG. 1) imaging system according to various aspects of the present technology may operate in conjunction with any suitable imaging system, such as a camera system, video system, machine vision, vehicle navigation, surveillance system, motion detection system, image stabilization system, and the like. For example, referring to FIG. 4, the imaging system may comprise an electronic device, such as a digital camera 400. The system may comprise a central processing unit (CPU) 405 that communicates with various devices over a bus 410. Some of the devices connected to the bus 410 may provide communication into and out of the system, for example an input/output (I/O) device 415. Other devices connected to the bus 410 provide memory, for example, a random access memory (RAM) 420, hard drive, and one or more peripheral memory devices 425, such as a floppy disk drive, compact disk (CD) drive, USB drives, memory cards, and SD cards. While the bus 410 is illustrated as a single bus, any number of busses may be used to provide communication paths to interconnect the devices.

Figure 4:
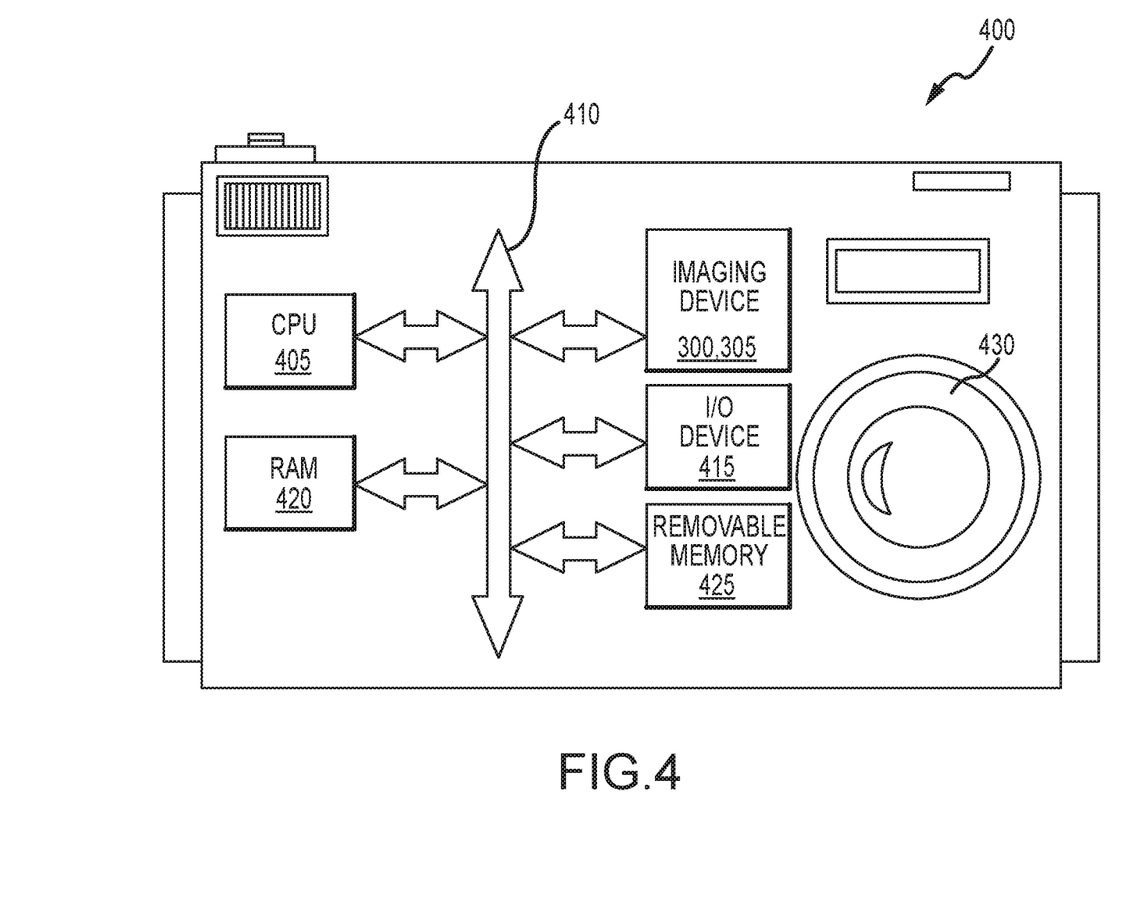
FIG. 4 representatively illustrates an imaging system in accordance with an exemplary embodiment of the present technology.

The imaging system may further comprise an imaging sensor for capturing image data. For example, light may enter the camera through a lens 430 and strike the image sensor. The image sensor may detect and convey the information that constitutes an image, for example by converting the variable attenuation of waves (as they pass through or reflect off objects) into electronic signals. The image sensor may be implemented in conjunction with any appropriate technology, such as using semiconductor charge-coupled devices (CCD), active pixel sensors in complementary metal-oxide-semiconductors (CMOS) or N-type metal-oxide-semiconductors (NMOS), analog sensors, and/or flat panel detectors.

Figure 3:
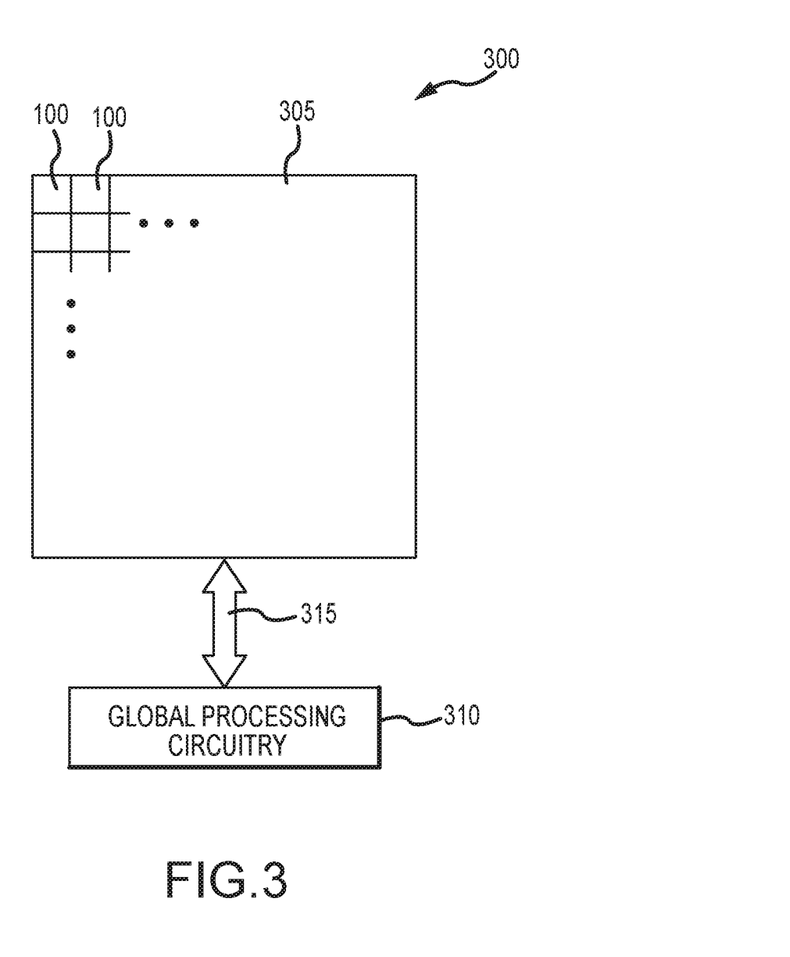
FIG. 3 representatively illustrates an image sensor in accordance with an exemplary embodiment of the present technology.

Referring to FIG. 3, an exemplary image sensor 300 may comprise a pixel array 305 comprising a plurality of multi-storage pixels 100 (FIG. 1) arranged in rows and columns. The pixels 100 may be electrically connected via metal wirings or other suitable connections. The image sensor 300 may be formed in silicon using any suitable complementary metal-oxide semiconductor (CMOS) technology and/or fabrication process.

In various embodiments, the image sensor 300 may further comprise a processing circuit 310. The processing circuit 310 may be coupled to the pixel array 305 via a communication bus 315, wherein the communication bus 315 may transmit and receive signals, such as control and data signals, between the pixel array 305 and the processing circuit 310. The processing circuit 310 may comprise a control unit (not shown) for transmitting control signals. The processing circuit 310 may also comprise a clocking mechanism to synchronize transmission of control signals. The processing circuit 310 may read the pixel signals through control lines accessed in a per-row manner. In various embodiments, the processing circuit 310 may be formed on the same chip as the pixel array 305.

Figure 1:
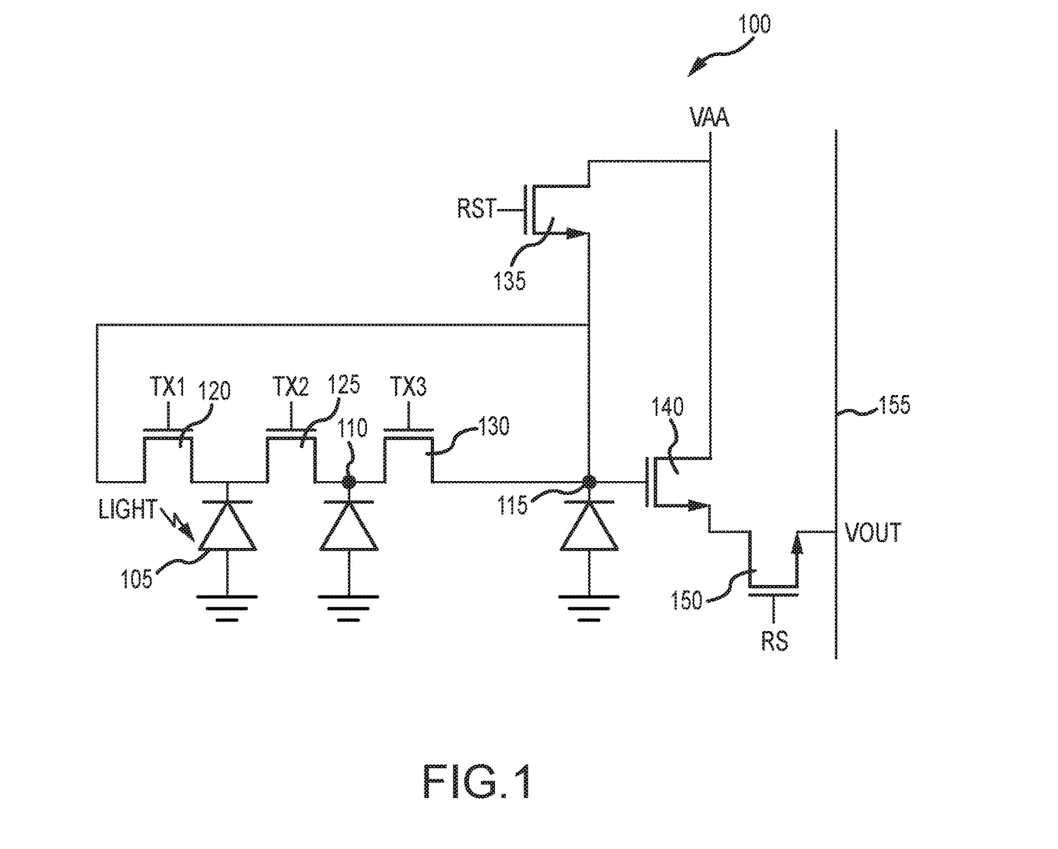
FIG. 1 representatively illustrates a multi-storage pixel in accordance with an exemplary embodiment of the present technology.

Each multi-storage pixel 100 of the image sensor 300 samples a portion of the image and generates a corresponding signal. Referring to FIG. 1, in an exemplary embodiment of the present technology, the multi-storage pixel 100 may comprise a photosensitive element 105, a storage node 110, and a floating diffusion node 115. In the present embodiment, the photosensitive element 105 operates by converting light into an electric charge and may comprise a photodiode, a photogate, or other semiconductor device responsive to light. In various embodiments, the photosensitive element 105 may comprise a pinned photodiode capable of being fully depleted at a depletion voltage.

The floating diffusion node 115 (also referred to as a "floating diffusion region" or "FD node") selectively stores charge. In the present embodiment, the floating diffusion node 115 may act as a sensing node and may be formed with any device or structure suitable for storing electric charge, such as a diode or capacitor. In various embodiments, the floating diffusion region 115 may be shielded from incoming light.

The storage node 110 (also referred to as a "storage region") selectively stores charge. In the present embodiment, the storage node 110 may comprise a doped region into which electric charge is transferred and stored. The storage node 110 may be formed with any device or structure suitable for storing electric charge, for example, a pinned diode or a storage gate. In various embodiments, the storage region 110 may be shielded from incoming light.

The photosensitive element 105 may be selectively coupled to the floating diffusion node 115 via a first transfer gate 120. In an exemplary embodiment, the first transfer gate 120 may comprise a switch, such as a transistor having a gate terminal, a drain terminal, and a source terminal, wherein the gate terminal may operate as a control terminal, and the source and drain terminals are used to carry current or transfer charge. For example, the gate terminal of the first transfer gate 120 may receive a first control signal TX1 from the processing circuit 310 (FIG. 3). In other embodiments, the first transfer gate 120 may comprise any other suitable device for providing current flow or charge transfer.

The floating diffusion node 115 may also be selectively coupled to a voltage source $V_{AA}$, for example via a switch, such as a reset gate 135. In the present embodiment, the reset gate 135 may comprise a transistor having a gate terminal, a drain terminal, and a source terminal, wherein the gate terminal may operate as a control terminal, and the source and drain terminals carry current when the reset gate 135 is activated. For example, the gate terminal of the reset gate 135 may receive a control signal RST from the processing circuit 310 (FIG. 3).

The photosensitive element 105 may be selectively coupled to the storage node 110 via another switch, such as a second transfer gate 125. In the present embodiment, the second transfer gate 125 may comprise a transistor having a gate terminal, a drain terminal, and a source terminal, wherein the gate terminal may operate as a control terminal and the source and drain terminals carry current or transfer charge. For example, the gate terminal of the second transfer gate 125 may receive a second control signal TX2 from the processing circuit 310 (FIG. 3). In other embodiments, the second transfer gate 125 may comprise any other suitable device for controlling current flow or charge transfer.

The storage node 110 may be selectively coupled to the floating diffusion node 115 via a switch such as third transfer gate 130. In the present embodiment, the third transfer gate 130 may comprise a transistor having a gate terminal, a drain terminal, and a source terminal, wherein the gate terminal may operate as a control terminal and the source and drain terminals carry current or transfer charge. For example, the gate terminal of the third transfer gate 130 may receive a third control signal TX3 from the processing circuit 310 (FIG. 3). In other embodiments, the third transfer gate 130 may comprise any other suitable device for providing current flow or charge transfer.

The pixel 100 may further comprise an amplifier 140 and a row select gate 150. The amplifier 140 amplifies the signal generated by the photosensitive element 105. For example, in the present embodiment, the amplifier 140 may comprise a source follower circuit comprising a transistor having a gate terminal, a drain terminal, and a source terminal. The gate terminal may receive signals corresponding to the charge generated by the photosensitive element and provide a corresponding amplified signal.

The row select gate 150 selectively connects the pixel 100 to the output. Each line in the imager sensor 300 may be selected and then read out, for example using a column select signal. The row select gate 150 for each pixel in a row may be activated to make that row active. In the present embodiment, the row select gate may comprise a transistor having a gate terminal, a drain terminal, and a source terminal. The gate terminal may be used as a control terminal and the source and drain terminals carry current. The gate terminal of the row select gate 150 may receive a control signal RS from the processing circuit 310 (FIG. 3). In an exemplary embodiment, the source terminal of the amplifier 140 may couple to the drain terminal of the row select gate 150.

Figure 2:
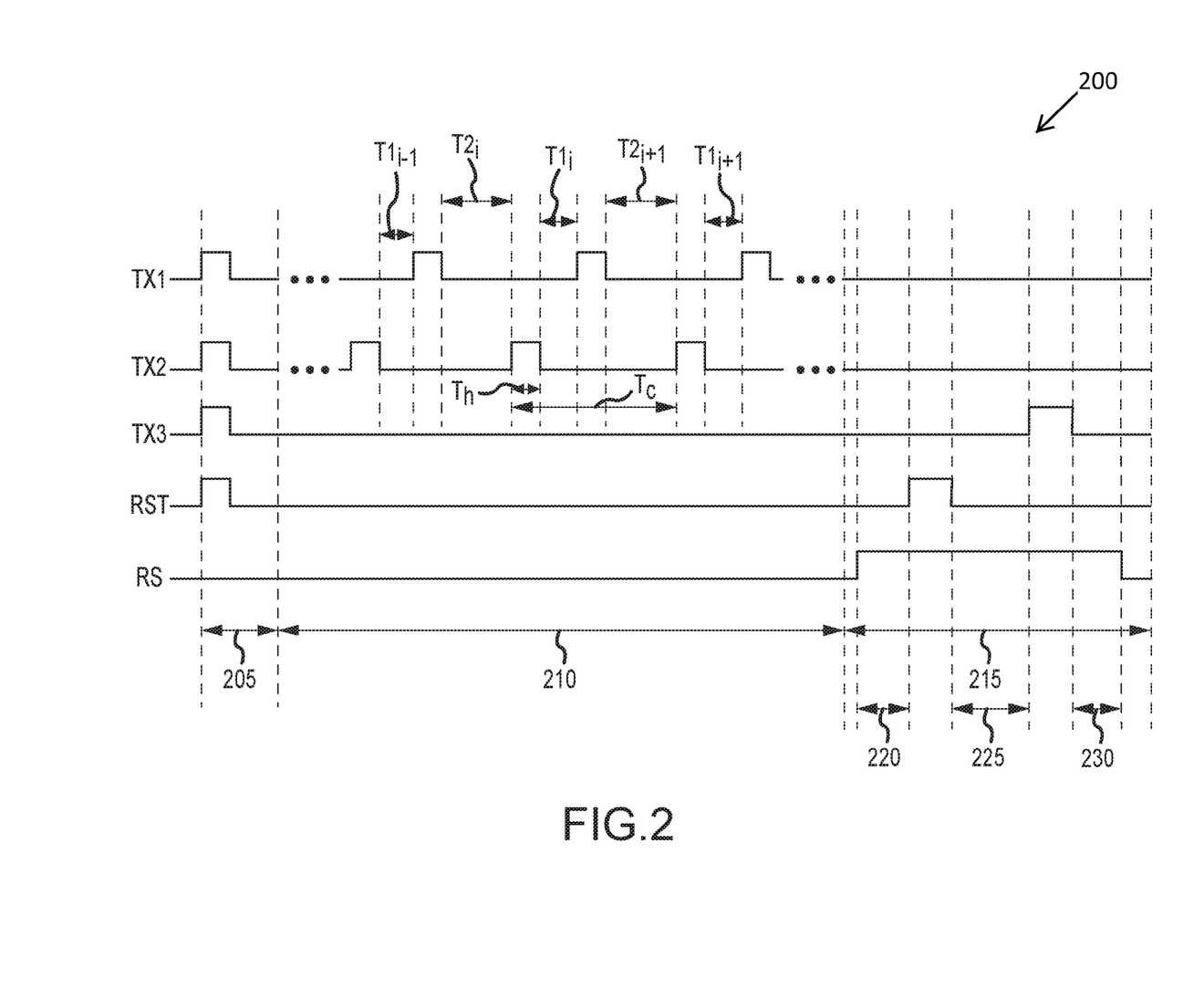
FIG. 2 representatively illustrates a timing diagram in accordance with an exemplary embodiment of the present technology.

Referring now to FIGS. 1 and 2, in operation 200, the image sensor 300 (FIG. 3) may operate in conjunction with a global reset period 205, an integration period 210, and a readout period 215. In an exemplary embodiment, the image sensor 300 may capture multiple signals with different exposure periods.

In an exemplary embodiment, during the global reset period 205, the first, second, and third transfer gates 120, 125, 130, as well as the reset gate 135, are simultaneously active. For example, control signals TX1, TX2, TX3, and RST are switched to a high voltage value simultaneously. Transmitting a control signal with a high voltage value to the first, second, and third transfer gates 120, 125, 130, and reset gate 135 resets the photosensitive element 105. After a predetermined period of time, the first, second, and third transfer gates 120, 125, 130, and reset gate 135 may be deactivated, for example via low voltage control signals. In an exemplary embodiment, all pixels 100 in the pixel array 305 (FIG. 3) receive the same control signals and are reset simultaneously.

After the reset period 205 has been completed, the global integration period 210 begins. During integration, the photosensitive element 105 absorbs light and converts the light into an electric charge. In an exemplary embodiment, the electric charge produced in the photosensitive element 105 is transferred to both the storage node 110 and the floating diffusion node 115. Charge transfer from the photosensitive element 105 to the storage node 110 and the floating diffusion node 115 may be controlled by selectively activating control signals TX1 and TX2 by pulsing the signals high at different times, wherein the pulses for control signals TX1 and TX2 do not overlap. For example, control signals TX1 and TX2 do not activate the first and second transfer gates 120, 125 at the same time. Instead, only one of the first and second transfer gates 120, 125 is activated at any given time. In an exemplary embodiment, the integration period may comprise one or more exposures.

After a first exposure period T1, typically measured in micro seconds (μs), the first transfer gate 120 may be activated, for example via a high voltage value control signal TX1, allowing the charge accumulated in the photosensitive element 105 to transfer to the floating diffusion node 115. The first transfer gate 120 may be deactivated, such as via a low voltage value control signal TX1, to stop charge transfer to the floating diffusion node 115. After a second exposure period T2, measured in microseconds (μs), a high voltage value control signal TX2 activates the second transfer gate 125, allowing the charge accumulated in the photosensitive region 105 to transfer to the storage node 110. A low voltage value control signal TX2 stops charge transfer to the storage node 110. Charge transfer to the floating diffusion node 115 and the storage node 110 may begin in any order. For example, at the start of the integration period 210, charge may be transferred and stored in either one of the floating diffusion node 115 or the storage node 110. As such, the second exposure period T2 may occur earlier in time than the first exposure period T1.

In an exemplary embodiment, during the integration period 210, control signals TX1 and TX2 may be asserted multiple times such that the charges transferred the floating diffusion node 115 are summed. Likewise, the charges transferred to the storage region 110 are summed (binned). Operation of the control signals TX1 and TX2 may be controlled by the processing circuit 310 (FIG. 3) and may operate cyclically, such that charge is transferred from the photosensitive element 105 to the floating diffusion node 115 and then, immediately after another exposure period, charge is transferred from the photosensitive element 105 to the storage region 110. In other embodiments, charge may not be transferred in a cyclical manner, but may be transferred in any suitable pattern. For example, charge may be transferred consecutively to the storage region 110 for any number suitable of times; likewise, charge may be transferred consecutively to the floating diffusion node 115 for any suitable number of times.

In an exemplary embodiment, where the integration period comprises multiple exposure periods $T1_i$, $T2_i$, the charge portions transferred to the storage region 110 may accumulate and are summed. Likewise, the charge portions transferred to the floating diffusion node 115 may accumulate and are summed. The transfer of multiple charge portions with corresponding exposure periods $T1_i$, $T2_i$ to each of the storage region 110 and the floating diffusion node 115 may result in the accumulated charges having different total exposure times $T1_{total}$, $T2_{total}$.

In an exemplary embodiment, the first exposure period T1 may be shorter than the second exposure period T2. A long exposure period may be used to capture low-light portion of a scene, while a short exposure period may be used to capture bright portions of the scene. For example, the charge transferred to the floating diffusion node 115 after the first exposure period T1 captures bright scenes (i.e. high light signals), and the charge transferred to the storage node 110 after the second exposure period T2, where T2 is greater than T1, captures low-light scenes (i.e. low light signals). As such, the total exposure time for charge accumulated in the storage node 110 may be longer than that of the total exposure time for charge accumulated in the floating diffusion node 115. The total exposure times may be described by the following equations, where n and m are the upper limits of the number of exposures and i is the index number for each exposure.

$$T1_{total} = \Sigma_{i=1}^{n} T1_i$$

$$T2_{total} = \Sigma_{i=1}^{m} T2_i$$

In various embodiments, n may be equal to m, n may be greater than m, or n may be less than m. The upper limits of the number of exposures n, m may be selected to suit a particular application. Additionally, the length of the exposure periods $T1_i$, $T2_i$ may vary during any one integration period 210, for example, $T1_1$ may be 50 μs (microseconds), while $T1_{10}$ may be 400 μs.

Dynamic range of the image sensor may be defined as the ratio of the sum of second exposure periods T2 to the sum of the first exposure periods T1 (i.e. $T2_{total}/T1_{total}$). The dynamic range may be adjusted during operation by increasing and/or decreasing the length of any of the exposures times $T1_i$, $T2_i$. The total exposure times $T1_{total}$, $T2_{total}$ may be tracked in real time such that a running total may be computed during the integration period 210 and transmitted to the control unit, where the control unit may adjust the duration of any subsequent exposure periods $T1_i$, $T2_i$.

Pulsing of the control signals TX1, TX2 may be represented as a duty cycle, where the duty cycle is defined as a length of time where the signal is pulsed high $T_h$, to activate the transfer gates 120, 125 divided by the total amount of time in a cycle $T_c$. In various embodiments, exposure periods $T1_i$, $T2_i$ may be predetermined, while in other embodiments, the exposure periods $T1_i$, $T2_i$ may be varied, resulting in a varied duty cycle. For example, the duty cycle and frequency of a voltage value applied to the control signals TX1 and TX2 may be synchronized to a pulsing light source for time of flight applications. The duty cycle and frequency of a voltage value applied to the control signals TX1 and TX2 may also be used to mitigate amplitude modulated light sources, such as LEDs (light emitting diodes).

Once the integration period 210 ends, the readout period 215 begins. In an exemplary embodiment, the pixel signals are read out on a row-by-row basis. A high voltage value is applied to the row select control signal RS, and in an exemplary embodiment, the row select control signal RS maintains a high voltage value for the duration of the readout period 215 for each row. Applying a high voltage value to the row select control signal RS allows the charge that has accumulated in the floating diffusion node 115 to be read out of the pixel 100 via a communication line 155 as a voltage which is proportional to the amount of accumulated charge. The readout process produces a first pixel signal comprising a corresponding voltage. The first pixel signal may be unable to undergo correlated double sampling since the floating diffusion reset voltage cannot be measured prior to readout. However, the first pixel signal can be double sampled, once before the reset gate 135 is activated 220 and once using the voltage level post reset 225.

While the row select control signal RS maintains a high voltage value, the reset control signal RST activates the reset gate 135 and resets the floating diffusion node 115. At this time 225, the floating diffusion reset level can be sampled and used for double sampling of the first pixel signal, and used for correlated double sampling of the second pixel signal.

Once the floating diffusion node 115 has been reset and the reset level sampled, the charge that has accumulated in the storage node 110 can be read out. For example, activating the third transfer gate 130 via control signal TX3 allows the charge to transfer from the storage node 110 through the floating diffusion node 115, and the resulting voltage of pixel 100 is accessible via the communication line 155. The readout produces a second pixel signal comprising a corresponding voltage. In various embodiments, as described above, the second pixel signal read out from the storage node 110 may undergo correlated double sampling to reduce noise since the voltage on the floating diffusion node 115 may be measured twice, once in a reset condition 225 (prior to activating the third transfer gate 130), and once after the charge from the storage node 110 has been transferred to the floating diffusion node 115, 230.

After both pixel signals have been read out of the floating diffusion node 115 and the storage node 110, the row select control signal applies a low voltage value to end the readout period 215. A new global reset period 205 may begin again.

In an exemplary embodiment, after completion of the readout period 215, the pixel signals (i.e. one capture using a long exposure and one capture using a short exposure) may be combined to produce a high dynamic range image utilizing an image signal processor (not shown). In various embodiments, the image signal processor may also perform color processing and tone mapping operations, such as demosaicing, white-balance, and color correction.

The embodiments of FIGS. 2 and 3 in which the pixel array 305 is described as operating in global shutter mode is merely illustrative. If desired, the pixel array 305 having the processing circuit 310 for operating in global shutter mode may be operated in rolling shutter mode. The particular mode of operation depends on the timing and operation of the control signals control signals TX1, TX2, TX3, RST, and RS. For example, in rolling shutter mode, the signals controlling the integration 210 readout 215, and reset 205 of each pixel 100 would be operated sequentially in a row-by-row fashion.

Additionally, the terms "first" and "second" do not connote a particular order in time, but rather distinguish between distinct elements, events, conditions, and the like. For example, the second exposure period T2 may occur earlier in time than the first exposure period T1.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

While the technology has been described with reference to specific exemplary embodiments, various modifications and changes may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A pixel array responsive to a processing circuit for transmitting control signals, comprising:
    a plurality of pixels, wherein each pixel comprises:
        a photosensitive element responsive to light;
        a first transfer gate coupled to the photosensitive element, wherein the first transfer gate selectively couples the photosensitive element to a floating diffusion region during an integration period, and transfers a first charge, after a first exposure period, from the photosensitive element to the floating diffusion region in response to a first control signal; wherein the floating diffusion region stores the first charge during the integration period; and
        a second transfer gate coupled to the photosensitive element, wherein the second transfer gate selectively couples the photosensitive element to a storage region during the integration period, and transfers a second charge, after a second exposure period, from the photosensitive element to the storage region in response to a second control signal; wherein the storage region stores the second charge during the integration period.

2. The pixel array of claim 1, wherein the floating diffusion region comprises a diode.

3. The pixel array of claim 1, wherein the floating diffusion region comprises a capacitor.

4. The pixel array of claim 1, wherein the storage region comprises a diode.

5. The pixel array of claim 1, further comprising a third transfer gate coupling the storage region to the floating diffusion region for transferring the second charge from the storage region to the floating diffusion region.

6. The pixel array of claim 5, further comprising a reset gate coupling the floating diffusion region to a voltage source.

7. The pixel array of claim 1, wherein the floating diffusion region and the storage region each store multiple charges with corresponding exposure periods resulting in the storage region storing charge with a second total exposure period and the floating diffusion region storing charge with a first total exposure period; wherein the second total exposure period is greater than the first total exposure period.

8. The pixel array of claim 1, wherein, during a readout period, the first charge is read out from the floating diffusion region, the floating diffusion region is reset via a reset signal, and the second charge is read out from the storage region after reset of the floating diffusion region.

9. A method for storing charge in an imaging device, comprising:
during an integration period:
generating a first charge portion with a photosensitive element during a first exposure period;
transferring the first charge portion from the photosensitive element to a floating diffusion region via a first transfer gate;
generating a second charge portion with the photosensitive element during a second exposure period; and
transferring the second charge portion from the photosensitive element to a storage node via a second transfer gate.

10. The method of claim 9, wherein the second exposure period is greater than the first exposure period.

11. The method of claim 9, wherein the first and second exposure periods are synchronized to a pulsing light source.

12. The method of claim 9, further comprising cyclically generating and transferring the first and second charge portions, wherein the first charge portions accumulate and are summed to form a first accumulated charge, and the second charge portions accumulate and are summed to form a second accumulated charge.

13. The method of claim 12, further comprising computing a ratio of the second accumulated charge to the first accumulated charge.

14. The method of claim 13, wherein the first and second exposure periods are extended based on the computed ratio.

15. The method of claim 12, further comprising reading out the first accumulated charge from the floating diffusion region via a row select gate.

16. The method of claim 15, further comprising resetting the floating diffusion region by applying a reset signal via a reset gate.

17. The method of claim 16, further comprising reading out the second accumulated charge from the storage node via a third transfer gate, wherein the charge moves through the floating diffusion region.

18. An imaging system, comprising:
a control unit, wherein the control unit transmits a control signal; and
a pixel array, communicatively coupled to the control unit, comprising a plurality of pixels arranged in rows and columns, wherein each pixel comprises:
a photosensitive element responsive to light;
a first transfer gate, coupled to the photosensitive element and responsive to a first control signal, wherein the first transfer gate transfers a first charge from the photosensitive element to a floating diffusion region after a first exposure period during an integration period;
a second transfer gate, coupled to the photosensitive element and responsive to a second control signal, wherein the second transfer gate transfers a second charge from the photosensitive element to a storage region after a second exposure period during the integration period;
a reset gate, responsive to a third control signal, wherein the reset gate resets the floating diffusion region prior to transfer of the second charge; and
a third transfer gate, coupled between the storage region and the floating diffusion region and responsive to a fourth control signal, wherein the third transfer gate transfers the second charge from the storage region to the floating diffusion region.

19. The system of claim 18, wherein the control unit coordinates the plurality of pixels to integrate simultaneously.

20. The system of claim 18, wherein:
the floating diffusion region and the storage region each store multiple charges with corresponding exposure periods resulting in the storage region storing charge with a second total exposure period and the floating diffusion region storing charge with a first total exposure period; and
the second total exposure period is greater than the first total exposure period.

* * * * *